United States Patent [19]

Kaun et al.

[11] 4,313,259

[45] Feb. 2, 1982

[54] METHOD FOR MANUFACTURING AN ELECTROCHEMICAL CELL

[75] Inventors: Thomas D. Kaun, New Lenox; Paul F. Eshman, Bolingbrook, both of Ill.

[73] Assignee: The United States of America as represented by the United States Department of Energy, Washington, D.C.

[21] Appl. No.: 148,325

[22] Filed: May 9, 1980

[51] Int. Cl.$^3$ .................... H01M 10/04; H01M 10/28
[52] U.S. Cl. .................................. 29/623.2; 29/623.5; 429/112
[58] Field of Search ................. 429/112, 118, 119, 52; 29/623.5, 623.2

[56] References Cited

U.S. PATENT DOCUMENTS

| | | | |
|---|---|---|---|
| 585,853 | 7/1897 | Samuels | 429/136 |
| 3,404,041 | 10/1968 | Inami | 429/112 |
| 3,471,330 | 10/1969 | Berger et al. | 429/112 |
| 4,011,374 | 3/1977 | Kaun | 429/220 |
| 4,029,860 | 6/1977 | Vissers et al. | 429/122 |
| 4,086,396 | 4/1978 | Mathers et al. | 429/112 |
| 4,110,517 | 8/1978 | Arntzen | 429/133 |
| 4,189,827 | 2/1980 | Eberhart et al. | 29/623.1 |

*Primary Examiner*—Daniel C. Crane
*Attorney, Agent, or Firm*—Hugh W. Glenn; Robert J. Fisher; Richard C. Besha

[57] ABSTRACT

A secondary electrochemical cell is prepared by providing positive and negative electrodes having outer enclosures of rigid perforated electrically conductive material defining an internal compartment containing the electrode material in porous solid form. The electrodes are each immersed in molten electrolyte salt prior to cell assembly to incorporate the cell electrolyte. Following solidification of the electrolyte substantially throughout the porous volume of the electrode material, the electrodes are arranged in an alternating positive-negative array with interelectrode separators of porous frangible electrically insulative material. The completed array is assembled into the cell housing and sealed such that on heating the solidified electrolyte flows into the interelectrode separator.

3 Claims, 5 Drawing Figures

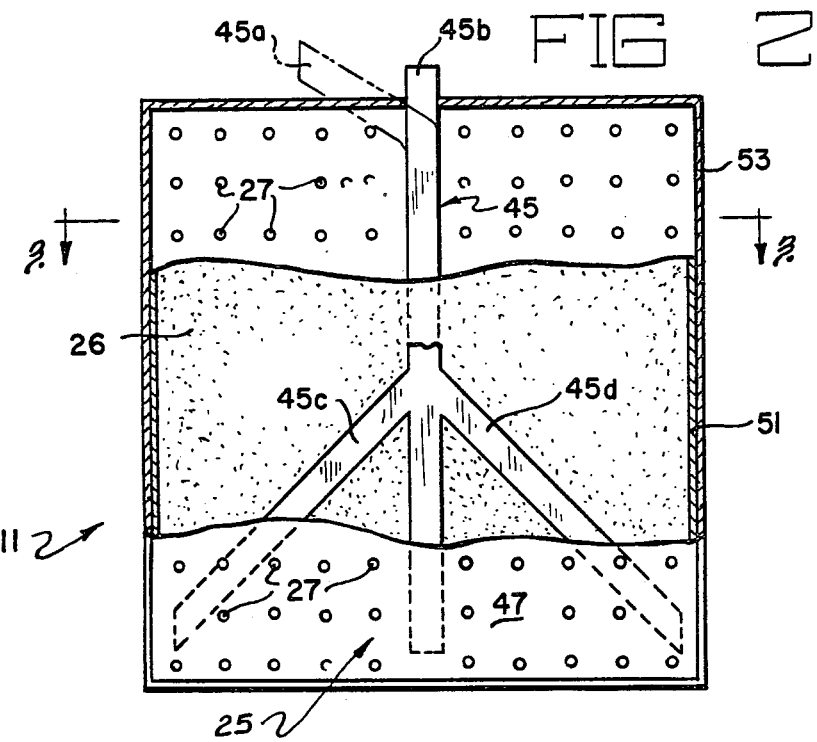
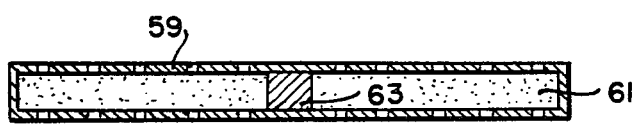
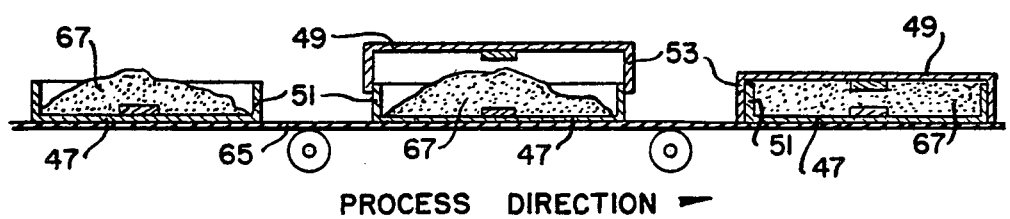

METHOD FOR MANUFACTURING AN ELECTROCHEMICAL CELL

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to the design of secondary electrochemical cells. It is particularly applicable to cells that operate at high temperatures with molten salt electrolyte and include corrosion resistant high temperature ceramic materials such as boron nitride, yttria, silicon nitride, aluminium nitride, calicum zirconate and magnesium oxide as cell separator materials. These materials, particularly boron nitride are quite frangible in felt, foam or compacted powder forms such that they are easily crushed, crumbled or punctured during cell operation or assembly. In previous cell designs, this material has been supported by the electrode structure often including screens or cloths disposed at electrode surfaces. The screen or cloth has the additional purpose of retaining particles of electrochemically active material within the electrodes. In order to achieve particle retention, fine mesh of e.g. 200–325 U.S. standard mesh have been selected but such screens or cloths with fine strands have been subject to ruptures followed by cell shorting due to bridging of electrode materials or stray screen wires.

Prior methods of cell assembly have involved assembling electrodes and separators into the cell housing followed by degassing under vacuum and filling the cell with molten electrolyte in a time consuming process.

Although various secondary electrochemical cells may advantageously incorporate the teachings of the present invention, those particularly contemplated include solid electrochemically active material such as alloys of alkali metals or alkaline earth metals in the negative electrode and solid transition metal chalcogenides such as iron sulfides, cobalt sulfides, nickel sulfides, etc., in the positive electrode. Cells of these types can include molten salt electrolytes such as alkali metal halides and alkaline earth metal halides or mixtures of these materials. Such cell materials are well known and are described in various patents and publications relating to this subject matter.

The following patents illustrate the general field of this development.

Arntzen, U.S. Pat. No. 4,110,517, discloses an electrochemical cell employing frangible forms of boron nitride and other ceramic materials as an electrically insulative cell separator.

Vissers et al, U.S. Pat. No. 4,029,860, describes a compartmented or honeycombed structure used as a current collector and to support electrochemically active material within the electrode of an electrochemical cell.

Kaun et al, U.S. Pat. No. 4,011,374, describes the use of a thermosetting resin as a moldable material into which electrochemically active material is blended for preparing electrodes.

Mathers et al, U.S. Pat. No. 4,086,396 discloses an electrochemical cell including a layer of powdered electrically insulative ceramic between electrodes of opposite polarity.

Eberhart et al, U.S. Pat. No. 4,189,827 teaches the use of $LiAlCl_4$ to enhance wetting of BN by molten electrolyte salt.

SUMMARY OF THE INVENTION

In view of the above, it is an object of the present invention to provide an improved method of preparing an electrochemical cell that employs frangible interelectrode separators of electrically insulative material.

It is a further object to provide such a method in which difficult and time consuming degassing and electrolyte filing steps can be omitted.

It is still a further object to provide such a method in which cell components including electrodes, separators, electrolytic salt and electrically insulative material are inserted as a unit into the cell housing.

It is also an object to provide a secondary electrochemical cell having frangible interelectrode separators supported by adjacent electrode structures.

It is also an object to provide such a cell that is especially adapted for assembling as a unit, the electrodes, electrolytic salt, interelectrode separators and electrically insulative material into the cell housing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention positive and negative electrodes are prepared with an outer rigid enclosure of perforated electrically conductive material defining an internal compartment containing electrochemically active material. The electrodes are immersed in molten electrolyte salt to substantially fill the void volume and assembled into an array of alternate positive and negative electrodes separated by porous frangible electrically insulative ceramic including gas-containing porous volume. The assembled array is inserted as a unit into the cell housing which is then sealed.

In other aspects the sealed cell is heated to above the melting point of the electrolyte to permit it to flow into the porous volume of the frangible interelectrode separator. The normal expansion of alkali metal halides and alkaline earth metal halides provides sufficient volume. In preparing the array for insertion into a cell housing of electrically conductive material electrically insulative layers are disposed on electrode surfaces exposed to contact by the cell housing. The frangible electrically insulative material can be pretreated with $LiAlCl_4$ prior to cell assembly to enhance wetting by electrolyte on activation of the cell.

The invention also contemplates a secondary electrochemical cell especially adapted for assembly as a unit into the cell housing. The positive and the negative electrodes include an outer enclosure of rigid perforated electrically conductive material defining an internal compartment for electrode material and solidified electrolytic salt permeated throughout to substantially fill the internal compartment.

In more specific aspects, the use of electrodes of about the same major surface area allows the edge surfaces of electrodes of opposite polarity to be essentially flush to facilitate placing layers of electrically insulative material between the electrode edge surface and the cell housing.

In one other aspect, alternate electrodes of opposite electrode polarity to adjacent electrodes have outwardly extending electrical conductors angled from their edge surfaces. While the adjacent electrodes have an outwardly extending electrical conductors normal to the corresponding edge surface to permit offset side by side bus-bar connection to the respective electrode conductors.

BRIEF DESCRIPTION OF THE DRAWINGS

The present invention is illustrated in their accompanying drawings wherein

FIG. 2 is an elevation view of an electrode.

FIG. 4 is an alternate cross-section of an electrode.

FIG. 5 is a schematic illustration of a method of preparing electrodes.

DETAILED DESCRIPTION OF THE PREFERRED EMBODIMENT

Figure 1:
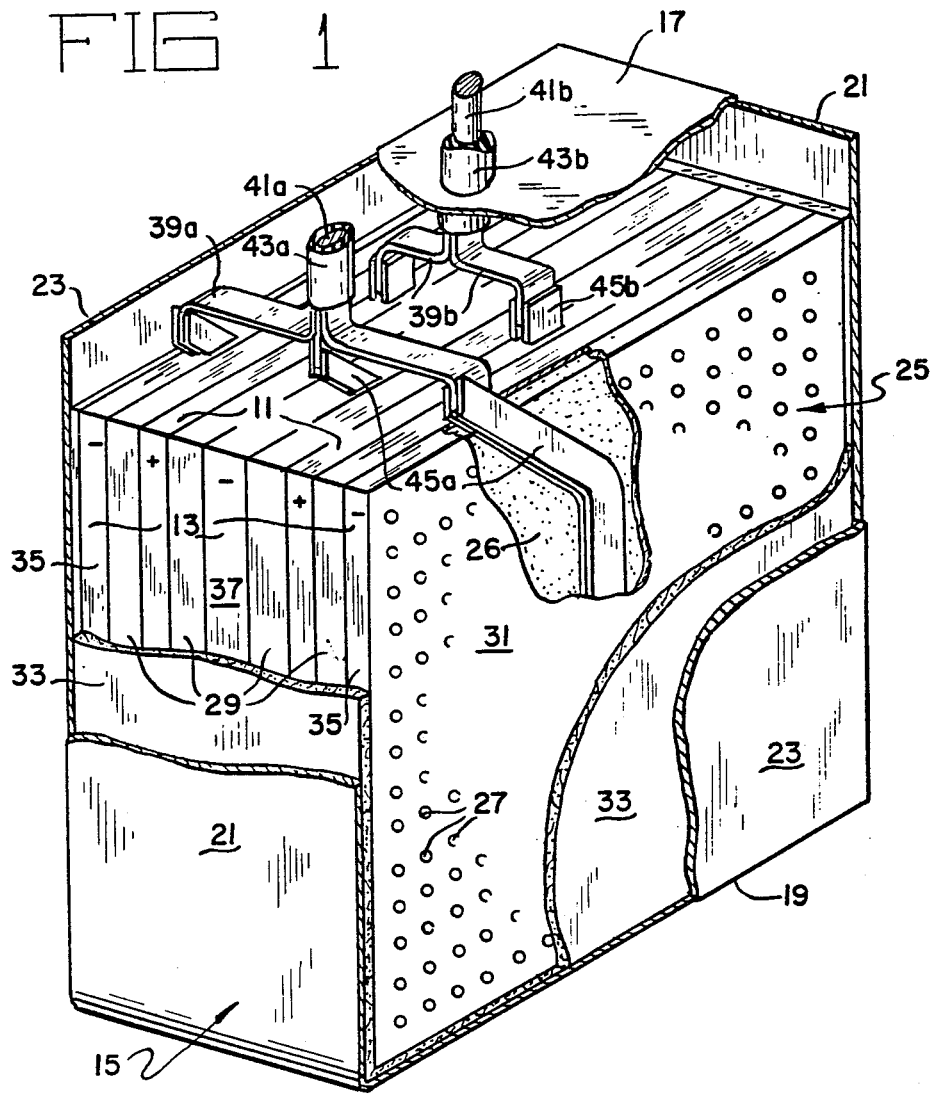
FIG. 1 is a perspective view of an electrochemical cell.

In FIG. 1 a secondary electrochemical cell is illustrated including a plurality of positive 11 and negative 13 electrodes of plate-like shape contained within a prismatic housing 15. The housing is illustrated of rectilinear prismatic shape to contain the rectilinear plate-like electrodes, however, it will be understood that various other cylindrical or prismatic shapes can be employed in a consistent manner for the containment of electrodes.

The cell housing 15 as illustrated includes top 17 and bottom 19 walls, at least two end walls 21 and at least two side walls 23 to define an internal cell volume for containing the plurality of positive and negative electrodes.

The electrodes are aligned as illustrated in an alternating array of positive 11 and negative 13 electrodes along the cumulative thickness of their edge surfaces, i.e. minor electrode surfaces facing the end walls 21 the top wall 17 and the bottom wall 19 of the cell housing 15. Electrodes of opposite polarity are electrically separated by layers 29 of frangible porous electrically insulative material facing their major side surfaces of the electrodes of opposite polarity within the array. The electrodes 11, 13 include an outer enclosure 25 of rigid electrically conductive material. The outer walls of enclosure 25 at least at the major side surfaces 31 of each electrode include openings 27 but with material remaining to provide firm support for the layers of frangible electrically insulative material 29 separating the electrodes.

The electrochemically active material in enclosure 25 of the individual electrodes can be of any suitable type to provide alternate positive 11 and negative 13 electrodes in the electrode array. Alloys of alkali metals or alloys of alkaline earth metals containing alloying materials of aluminum, silicon, magnesium and combinations thereof are contemplated for the negative electrodes. The positive electrodes can contain chalcogenides or preferably transition metal chalcogenides as electrochemically active material. Both the positive and the negative electrodes can include electrolyte such as mixtures of alkali metal halides, mixtures of alkaline earth metal halides, or combined mixtures of these halides. Cells containing these type active materials and electrolytes are well known and described in the above cited patents as well as other publications within the literature.

The active material contained within the electrode can be in various forms. It can comprise a mixture or paste of particulate electrochemically active material, electrically conductive current collector particles and particulate or molten electrolyte depending on temperature. Prepressed plaques of particulate active material and electrolyte is another suitable electrode form. In other electrodes, the active material can be bonded within a porous carbon matrix of thermosetting material prepared in a manner as described in U.S. Pat. No. 4,011,374 cited above.

In a preferred construction of the electrochemical cell, the alternating array of electrodes are separated and electrically insulated from the cell housing 15 at the housing end walls 21 and bottom wall 19 by a U-shaped continuous or segmented sheet or sheets of electrically insulated material 33. As illustrated in FIG. 1, the side surfaces of the electrodes of opposite polarity are of essentially the same surface area and the edge surfaces of the electrodes in the array are essentially flush to facilitate positioning the electrically insulative material. Additional layers of material 33 may be disposed between side surfaces 23 and the end electrodes 35. Electrically insulative material 33 may be the same as sheets 29 disposed intermediate electrodes of opposite polarity or of a tougher less porous material for sturdily prohibiting contact between edge surfaces of the electrodes and the cell housing. In this illustrated preferred embodiment, the end electrodes 35 in the alternating array of electrodes are of like polarity. This configuration minimizes the harmful consequences of insulation failure between end electrodes 35 and side walls 23 of the housing. In some cell applications the electrically insulative material 33 may be omitted at side walls 23 and the cell housing maintained at the polarity of the end electrodes 35.

In the specifically illustrated alternating array of electrodes, the center electrode 37 is of like polarity with that of end electrodes 35 and is of greater thickness than each individual end electrode to accommodate the active material within the two electrodes 11 of opposite polarity facing its two major side surfaces. In this particular electrode array, three negative and two positive electrodes are illustrated with the center and end electrodes of negative polarity. It will be understood that any reasonable odd number of electrodes can be provided. Also the polarity of the electrodes within an array may be reversed throughout the array provided the end electrodes are of like polarity and the centrally disposed electrodes having the same polarity as the end electrodes are of increased thickness to that of an individual end electrode.

Electrodes of like polarity are interconnected by one of two bus bars 39a and 39b electrically coupled to cell terminals 41a and 41b respectively of opposite polarity. Terminals 41a and 41b extend through and are electrically insulated from the top wall 17 of housing 15 by electrically insulative feedthroughs 43a and 43b. Electrical bus bars 39a and 39b are spaced lengthwise from one another within the cell housing and are each connected to individual electrodes by electrical conductors 45a 45b. Conductors 45a are illustrated as angling from electrodes of one polarity to permit lengthwise separation of the bus-bars.

Figure 3:
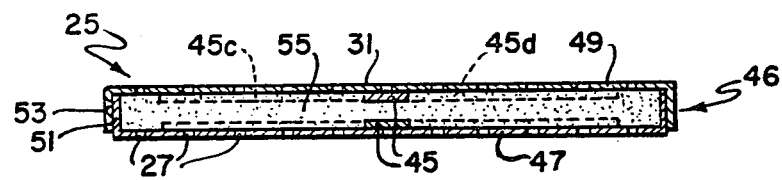
FIG. 3 is a cross-section view of the electrode of FIG. 2.

FIGS. 2 and 3 illustrate a preferred electrode structure for use in the electrochemical cell described above. This electrode structure is also described in detail in the assignee's copending patent application Ser. No. 148,312 filed May 9, 1980 entitled Electrode for Electrochemical Cell, by Kaun et al. The structure includes an outer enclosure 25 of rigid electrically conductive trays having openings 27 at least over the major side surfaces 31 of the electrode. Openings 27 may be provided by perforating, etching, expanding or other suitable process to the rigid trays.

Each electrode enclosure 25 is preferably constructed of two oppositely facing trays 47 and 49 with each tray including a flat sheet at its major side surface and laterally extending flanges 51, 53 at the perimetric edge surfaces of the electrode. The two trays are disposed with their flanges in oppositely facing alignment such that they slideably engage to enclose a central and expandable electrode compartment 55 for containing active electrode material. The oppositely facing trays of the electrode can be slideably fitted together by making tray 47 slightly smaller than tray 49 such that the flanges 51 of the smaller tray slideably fit within the open compartment of the larger tray.

The trays are provided of a metal alloy or other material compatible with the cell environment for example steel alloys and nickel alloys are contemplated for the transition metal chalcogenide-molten salt-alkali metal alloy cells. The trays at their major side surfaces 31 are of sufficient thickness and rigidity to provide firm and secure support for the frangible porous electrically insulative separators 29 disposed between the electrodes in the electrochemical cell. For example, 1008 carbon steel sheet of about 150 square centimeters cross-section area would typically include a thickness of about 0.025 centimeter. Materials of different cross-section area and rigidity may include greater or lesser thickness.

Trays 47 and 49 also include openings 27 of sufficiently large area to permit ion migration and electrolyte flow. However, sufficient metal must remain in the major tray surfaces to provide electrical current collection and to provide rigid firm support for the frangible interelectrode separators. As an example, sheets with about 30-50% open area are contemplated as suitable for this purpose.

The internal surface of each tray is provided with an attached electrical conductor 45 that is shown extending from top to bottom of the electrode. The lower portion of conductor 45 is illustrated with branches 45c and 45d angling from the conductor trunk portion to provide additional rigidity to the side surfaces and protrusions into contact with the electrochemically active material. The upper portion of electrical conductor 45 can include the alternate configurations illustrated as 45a and 45b for electrodes of opposite polarity. The upper portion at 45a is angled and thus offset while that at 45b is straight such that the corresponding conductors 45a or 45b of alternate electrodes of like polarity can be electrically coupled into common bus bars illustrated at 39a or 39b in FIG. 1. Electrical conductors 45 can be provided in laminated form as a bundle of strips particularly at upper portions 45a and 45b to form a flexible connection permitting lateral play between the conductor and bus bars as the cell operates.

FIG. 4 illustrates an alternate electrode cross-section in which a ring 59 of perforated metal sheet in rectangular form encloses the electrochemically active material 61 to serve as an electrode within the cell. An electrical conductor 63 is illustrated extending through the electrode center along the internal surfaces of the perforated rectangular ring. This alternate electrode structure can be more rigid but with some loss of the expandability offered by the FIG. 3 embodiment.

The porous electrically insulative separator materials are preferably a felt or powder of ceramic material. Boron nitride felt prepared of intertangled fibers has been found to be particularly well suited for lithium alloy-transition metal chalcogenide cells. Compacted magnesia powder is also contemplated as a suitable material for an interelectrode separator. Other felts or powders that may be employed include those of yttria, magnesia, zirconia, aluminum nitride, silicon nitride or combinations of these materials. The inventors have found by firmly and rigidly supporting felts or powders of this type adjacent to and between rigid perforated metal sheets, that the perforations in the metal sheets can be made even larger than the average particle sizes of the electrochemically active material within the individual electrodes. In such an arrangement, the ceramic felt or powder sufficiently occludes the perforations of the metal sheets to block migration of electrochemically active particles without impeding flow of molten or liquid electrolyte during cycling of the electrode. Another approach involves adding a thin mesh for particle retention on the internal tray surfaces.

A preferred method for preparing the electrodes of the present invention is illustrated in FIG. 5 where three electrodes in different stages of preparation are presented. A first tray 47 is positioned with its flange portions 51 extending upwardly to define an open sided compartment. As illustrated in the previous drawings, the flanges extend from the complete perimeter of the electrode tray 47. Electrochemically active material in a moldable form 67 is disposed in a measured amount into the open sided tray compartment on a flat support surface 65. A second tray 49 including outwardly extending flanges 53 that define a slightly larger perimeter than that of flanges 51 is positioned over tray 47 in slideable oppositely facing engagement. Tray 49 is then pressed downwardly against tray 47 until flanges 53 substantially overlaps flanges 51 and the electrode material is molded to substantially fill the internal compartment of the electrode. This pressing operation may be performed by rolling, flat pressing in stage or continuous steps or by other techniques within the skill of the art.

The electrode material selected for this process can be of any suitable material as discussed above containing the appropriate electrochemically active components for the positive or negative electrode. A moldable material can be prepared by forming a paste such as alkali metal halides as electrolyte with an electrochemically active material such as a transition metal chalogenide. One particularly suitable moldable medium includes a thermosetting resin and a solid volatile in mixture with the electrochemically active material. After the oppositely facing trays are pressed together to mold the electrode material into the shape of the compartment, the electrode can be heated to vaporize the solid volatile and cure the thermosetting resin to form a porous matrix containing the active material.

Examples of moldable material such as a green thermosetting resin in mixture with solid volatiles are given in the above cited U.S. Pat. No. 4,011,374, which is incorporated by reference for this purpose. Various thermosetting materials such as the phenolic epoxy or furfuryl resins in the form of monomers, partially polymerized liquids or paste can be blended into mixture with the solid volatiles. Volatiles such as carbonates, bicarbonates and other organic compounds such as alkali metal amides and hexochlroethane can be used. On subsequent heating of such mixtures within the enclosed cell compartment, the volatiles transform to gases and the thermosetting materials polymerize or even carbonized to form a rigid porous matrix containing the electrochemically active material.

In assembling the electrochemical cell illustrated in FIG. 1, the individual electrodes can be prepared in the manner discussed above. The electrodes include an outer enclosure of rigid but perforated electrically conductive material that defines an internal compartment containing the electrode material in a porous form including void volume. This electrode is immersed in molten electrolyte salt suitable for use as electrolyte in the cell to fill its void volume. For instance, electrolytes of alkali metal halides, alkaline earth metal halides and mixtures of these are contemplated. The molten electrolyte is permitted to solidfy throughout the previously void volume of the electrode such that it is permeated with solidified electrolyte salt.

The electrolyte permeated electrodes are arranged in an alternating positive - negative electrode array or stack with layers of porous frangible electrically insulative material between the electrodes of opposite polarity. Each interelectrode layer of electrically insulative material includes porous void volume. The array is surrounded at least on the edge surfaces of the electrodes as with the U-shaped layer of electrically insulative material described above before inserting into the cell housing through the top opening. The side surfaces of the end electrodes also can be covered with the electrically insulative material to prevent contact of the end electrodes to the cell housing. An outer shim metal layer (not shown) can be incorporated on the outside of the insulative material to impart support. As an alternate procedure, the cell housing can be provided of electrically insulative material or with a coating of electrically insulative material to obviate the need for the outer layers 33 of electrically insulative material.

In another advantageous procedure, the frangible porous electrically insulative material employed as interelectrode separators is treated with an agent to enhance wetting by the electrolytic salt chosen as electrolyte for the cell. Boron nitride felt layers are advantageously treated with powdered LiAlCl$_4$ in the manner described in U.S. Pat. No. 4,189,827 cited above prior to arranging the electrode array. In other arrangements, yttria or magnesia ceramic powders can be filled into a portion of the porosity of a boron nitride felt layer prior to cell assembly to enhance wetting.

On assembly and sealing the electrode array with interelectrode separators and insulating material into the cell housing it is sealed and the cell heated to above the melting point of the solidified electrolyte permeated within the electrodes to provide a flow of molten electrolyte into the porous volume of the frangible interelectrode separators. The normal expansion on melting provides sufficient electrolyte volume.

It will therefore be clear that the present invention provides an improved method of assembling a secondary electrochemical cell. The cell is conveniently assembled in a manner that is amenable to repetitive or continuous operation. The electrolyte is incorporated into the electrodes prior to assembly to obviate the need for time consuming filling and degassing operations. The frangible interelectrode separators need not be prewet with electrolyte outside the cell to minimize handling and the risk of fracturing. Where difficult to wet ceramic separators are employed procedures are presented for improvement of wetting by the molten electrolyte. The electrochemical cell includes an array of positive and negative electrodes of about the same dimensions at major surfaces to facilitate positioning electrically insulative material around the array. Each of the electrodes includes an outer enclosure of rigid perforated sheets of electrically conductive metal that are sufficient to provide vertical support to a layer of porous frangible electrically insulative ceramic material that might otherwise fragment during assembly or operation of the cell. This cell structure thus permits convenient loading of electrode arrays within the cell housing from a top opening while the frangible interelectrode separators are supported in an array of electrodes.

Although the present invention has been described in terms of specific embodiments and methods, it will be clear to one skilled in the art that various modifications can be made in the material, structure and process steps within the scope of the present invention as defined in the following claims.

The embodiments of the invention in which an exclusive property or privilege is claimed are defined as follows:

1. A method of preparing a secondary electrochemical cell including a housing having a top opening, positive electrodes containing a solid transition metal chalcogenide as electrochemically active material, negative electrodes containing an alloy of an alkali metal or an alkaline earth metal as electrochemically active material, a plurality of porous frangible boron nitride felt layer as electrically insulative separators between said electrodes and an electrolytic salt containing metal halides selected from the group consisting of alkali metal halides, alkaline earth metal halides and mixtures thereof said method comprising:

preparing a plurality of positive and negative electrodes of near equal dimensions at major surfaces, each electrode comprising an outer enclosure of rigid electrically conductive metal having perforated major surfaces and edge surfaces defining a compartment containing void volume and the respective electrochemically active material for said electrodes and providing each electrode with electrical terminal means communicating with said enclosure;

immersing said electrodes in said electrolytic salt in molten state to substantially fill the void volume thereof;

permitting said electrolytic salt to solidify within the void volume of said electrodes;

treating said plurality of porous frangible felt layers with a ceramic powder selected from magnesia or yttria to fill a portion of their porous void volume;

assembling an array of said positive and negative electrodes in alternate sequence separated by said treated porous frangible felt layers between major surfaces of electrodes of opposite polarity within a u-shaped sheet of electrically insulative material over edge surfaces of said electrodes, said array assembled with electrodes of like polarity having major surfaces exposed at opposite ends thereof;

inserting said assembled array as a unit into the top opening of said cell housing; and sealing said housing top opening while providing electrically insulative feedthroughs for said electrical terminal means of said positive and of said negative electrodes.

2. The method of claim 1 wherein said sealed cell is heated to melt said electrolytic salt and permit the molten salt to flow into the porous volume of the frangible electrically insulative material.

3. The method of claim 1 wherein the side, end and bottom surfaces of said array of electrodes are covered with electrically insulative material prior to inserting into said cell housing.

* * * * *